United States Patent
Niu

(10) Patent No.: US 10,268,768 B2
(45) Date of Patent: Apr. 23, 2019

(54) METHOD AND SYSTEM FOR PREPARING WEBSITE DATA IN RESPONSE TO A WEBPAGE REQUEST

(71) Applicant: Tencent Technology (Shenzhen) Company Limited, Shenzhen (CN)

(72) Inventor: Ming Niu, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 786 days.

(21) Appl. No.: 14/843,791

(22) Filed: Sep. 2, 2015

(65) Prior Publication Data
US 2015/0379143 A1 Dec. 31, 2015

Related U.S. Application Data

(63) Continuation of application No. PCT/CN2014/081465, filed on Jul. 2, 2014.

(30) Foreign Application Priority Data
Jul. 2, 2013 (CN) .......................... 2013 1 0273585

(51) Int. Cl.
G06F 17/30 (2006.01)
G06F 3/0482 (2013.01)

(52) U.S. Cl.
CPC ...... *G06F 17/30867* (2013.01); *G06F 3/0482* (2013.01); *G06F 17/3048* (2013.01); *G06F 17/3056* (2013.01); *G06F 17/30902* (2013.01)

(58) Field of Classification Search
CPC . G06F 17/3048; G06F 3/064; G06F 17/30902
(Continued)

(56) References Cited

U.S. PATENT DOCUMENTS 5,987,254 A * 11/1999 Subrahmanyam ...... G06F 8/433 717/155
2004/0249799 A1* 12/2004 Demarcken ......... G06F 17/3048
(Continued)

FOREIGN PATENT DOCUMENTS

CN 101650820 A 2/2010
CN 101877000 A 11/2010
(Continued)

OTHER PUBLICATIONS

Tencent Technology, ISRWO, PCT/CN2014/081465, Sep. 28, 2014, 7 pgs.
(Continued)

*Primary Examiner* — Marcin R Filipczyk
(74) *Attorney, Agent, or Firm* — Morgan, Lewis & Bockius LLP

(57) ABSTRACT

A method of preparing application data for visitors of a website is performed at a computer server. The computer server receives a webpage request initiated by a client device, the webpage request including a first element from a first dataset and a second element from a second dataset. In response, the computer server generates two sets of combinations between the first and second elements and respective elements of the second and first datasets, respectively. The computer server queries a cache for application data associated with each combination of elements. For each combination that returns a cache miss, the computer server retrieves the associated application data from an application database and stores the application data in the cache. The computer generates a response using application data associated with the first and second elements and returns the response to the client device.

18 Claims, 4 Drawing Sheets

(58) Field of Classification Search
USPC .......................................................... 707/710
See application file for complete search history.

(56) References Cited

U.S. PATENT DOCUMENTS

| | | | |
|---|---|---|---|
| 2006/0224938 A1 | 10/2006 | Fikes et al. | |
| 2010/0185644 A1 | 7/2010 | Gutt et al. | |
| 2015/0379143 A1* | 12/2015 | Niu .................... | G06F 17/3048 707/710 |

FOREIGN PATENT DOCUMENTS

| | | |
|---|---|---|
| CN | 102214192 A | 10/2011 |
| CN | 102411493 A | 4/2012 |

OTHER PUBLICATIONS

Tencent Technology, IPRP, PCT/CN2014/081465, Jan. 5, 2016, 5 pgs.

\* cited by examiner

METHOD AND SYSTEM FOR PREPARING WEBSITE DATA IN RESPONSE TO A WEBPAGE REQUEST

RELATED APPLICATIONS

This application is a continuation application of PCT Patent Application No. PCT/CN2014/081465, entitled "METHOD AND SYSTEM FOR PREPARING WEBSITE DATA IN RESPONSE TO A WEBPAGE REQUEST" filed on Jul. 2, 2014, which claims priority to Chinese Patent Application No. 201310273585.X, "METHOD AND SERVER FOR SEARCHING FOR WEBSITE DATA," filed on Jul. 2, 2013, both of which are hereby incorporated by reference in their entirety.

TECHNICAL FIELD

The present application relates to processing of website data, and in particular to a method and system for preparing website data in response to a webpage request.

BACKGROUND

Currently, during search for website data, a user selects an element from a plurality of drop-down options displayed on a webpage, and clicks a "submit" button to send a data search request including an option element to a search server. FIG. 1 shows an instance of a webpage 100 including at least two drop-down menus for submitting a webpage request for website data. In the instance, two drop-down menus include: a region (Northern China, Eastern China, Southern China) and a year (2011, 2012, 2013), where each drop-down menu has three options. Here, elements selected by a user are Northern China and 2013.

After receiving, from a user terminal, a data search request including a selected element, a server searches an application database for application data corresponding to Northern China 2013, and sends the application data to the user terminal. The application data in this instance is, for example, recorded data of each region in a corresponding year.

Backend data is stored in an application database, and a search server usually has a caching function. To increase a search speed, the search server puts relevant application data in a cache after receiving a data search request for the first time. In this manner, when a subsequent search request is received, needed application data can be directly retrieved from the cache and fed back to a user terminal. There are mainly two existing caching manners as follows, which are described below separately.

Manner 1:

In the manner, only application data requested by a user is stored in a cache. Such a manner has an advantage that a small amount of data is cached while has a disadvantage that the probability that the cache is used is low, and it is only when same data is requested again that the cache is used. By using the case in FIG. 1 as an example, the user requests application data of Northern China 2013, and only application data about Northern China 2013 is saved in a cache. In this case, the cache takes effect only when data of Northern China 2013 is requested again, and therefore the manner cannot effectively increase a search speed.

Manner 2:

When a user requests data, a search server acquires the data requested by the user and all data relevant to the user's request and stores them in a cache. Such a manner has an advantage that the probability that the cache is used is significantly increased. By using the case in FIG. 1 as an example, the user requests application data of Northern China 2013, so that the search server acquires 9 combinations of data elements in total, that is, Northern China 2013+Northern China 2012+Northern China 2011+Eastern China 2013+Eastern China 2012+Eastern China 2011+Southern China 2013+Southern China 2012+Southern China 2011, and stores the data in a cache. In this case, when the user requests any data next time, the data can be directly retrieved from the cache. However, a disadvantage is that a huge amount of data is cached; in practical applications, it is usually unlikely that a user searches for every combination of data elements, and in most cases only uses one or two combinations, and therefore a big resource waste occurs as the rest unused data is put in the cache. By taking the case in FIG. 1 as an example, the user needs to acquire financial data of each region in the year 2013; after the first time of data search, two more combinations of data are to be used, that is, data of Eastern China 2013 and data of Southern China 2013, and therefore, caching of rest data causes a waste of a storage resource.

In conclusion, in Manner 1, a usage rate of the cache is not high, whereas in Manner 2, a usage rate of the cache is high, but a usage rate of data is low and a resource waste is big. A compromise made between Solution 1 and Solution 2 would further meet demands by increasing a usage rate of a cache while saving a resource. However, at present this kind of technology still does not exist.

SUMMARY

The above deficiencies and other problems associated with the conventional approach of preparing application data for visitors of a website are reduced or eliminated by the present application disclosed below. In some embodiments, the present application is implemented in a computer server that has one or more processors, memory and one or more modules, programs or sets of instructions stored in the memory for performing multiple functions and communicating with one or more client devices (e.g., a computer or a smartphone) that has one or more processors, memory and one or more modules, programs or sets of instructions stored in the memory for performing multiple functions. Instructions for performing these functions may be included in a computer program product configured for execution by one or more processors.

One aspect of the present application involves a method of preparing application data for a website at a computer server having one or more processors and memory storing programs to be executed by the one or more processors. The computer server receives a first webpage request initiated by a client device, the webpage request including a first element and a second element, the first element belonging to a first dataset and the second element belonging to a second dataset. In response to the first webpage request, the computer server generates a first set of combinations between the first element and respective elements of the second dataset and a second set of combinations between the second element and respective elements of the first dataset, respectively. The computer server queries a cache for application data associated with each of the first and second sets of combinations of elements. For each of the first and second sets of combinations of elements that returns a cache miss, the computer server retrieves the associated application data from an application database and stores the retrieved application data in the cache. In addition, the computer generates a first response using application data associated with a combination of the first element and the second element and stored in the cache and returns the first response to the client device.

Another aspect of the present application involves a computer server including one or more processors, memory, one or more program modules stored in the memory and to be executed by the one or more processors. The program modules further include instructions for: receiving a first webpage request initiated by a client device, the webpage request including a first element and a second element, the first element belonging to a first dataset and the second element belonging to a second dataset; in response to the first webpage request, generating a first set of combinations between the first element and respective elements of the second dataset and a second set of combinations between the second element and respective elements of the first dataset, respectively; querying a cache for application data associated with each of the first and second sets of combinations of elements; retrieving, from an application database, application data associated with each of the first and second sets of combinations of elements that returns a cache miss by the querying and storing the retrieved application data in the cache; generating a first response using application data associated with a combination of the first element and the second element and stored in the cache; and returning the first response to the client device.

Another aspect of the present application involves a non-transitory computer readable storage medium stores one or more program modules in connection with a computer server having one or more processors, the program modules including instructions for execution by one or more processors. The instructions, when executed by the one or more processors, cause the computer server to perform the following instructions: receiving a first webpage request initiated by a client device, the webpage request including a first element and a second element, the first element belonging to a first dataset and the second element belonging to a second dataset; in response to the first webpage request, generating a first set of combinations between the first element and respective elements of the second dataset and a second set of combinations between the second element and respective elements of the first dataset, respectively; querying a cache for application data associated with each of the first and second sets of combinations of elements; retrieving, from an application database, application data associated with each of the first and second sets of combinations of elements that returns a cache miss by the querying and storing the retrieved application data in the cache; generating a first response using application data associated with a combination of the first element and the second element and stored in the cache; and returning the first response to the client device.

Various advantages of the present application are apparent in light of the descriptions below.

BRIEF DESCRIPTION OF THE DRAWINGS

The aforementioned features and advantages of the present application as well as additional features and advantages thereof will be more clearly understood hereinafter as a result of a detailed description of preferred embodiments when taken in conjunction with the drawings.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

To make the objectives, technical solutions, and advantages of the present application more comprehensible, the present application is further described in detail below with reference to the embodiments and accompanying drawings.

An inventor finds that in practical applications, after a first data search request, usually one element of a dataset (e.g., a drop-down menu) is changed to make another time of search. In the case that only data that is most possibly to be viewed is put in a cache after the first data search request is received, a compromise is reached between existing Manner 1 and Manner 2, so as to increase a usage rate of the cache while saving a resource.

Figures 1, 2:
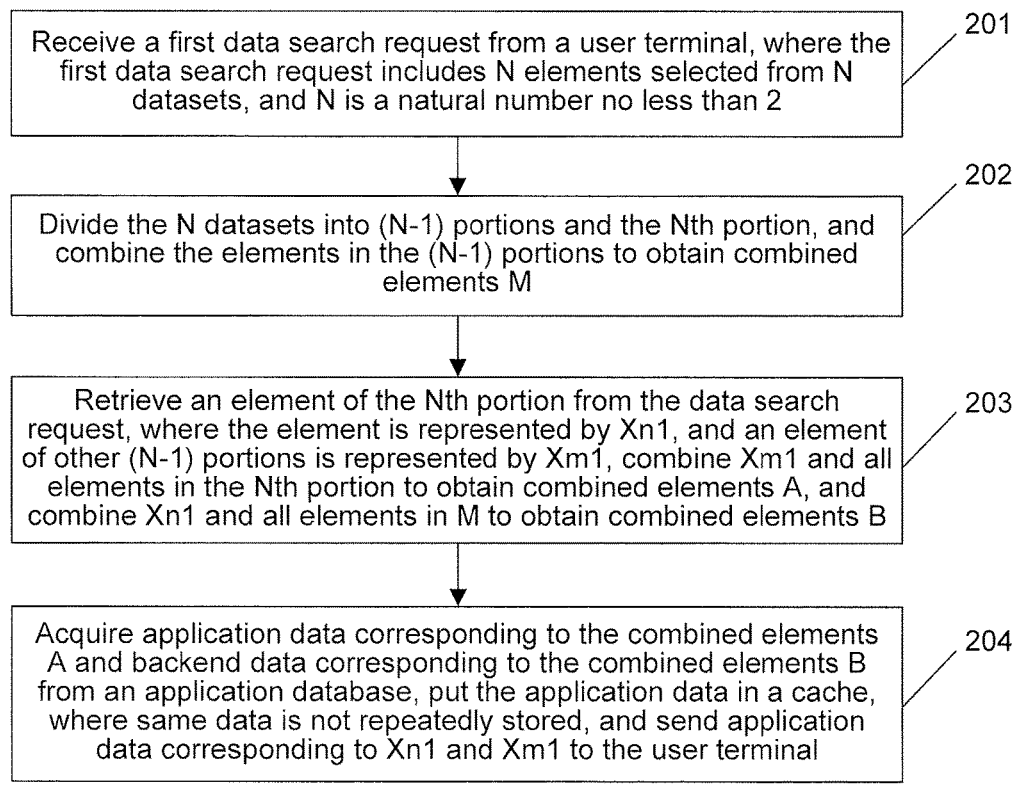
FIG. 1 shows an instance of a webpage including at least two drop-down menus for submitting a webpage request for website data.
FIG. 2 is a schematic flow chart of a method for preparing website data in response to a webpage request according to the present application.

FIG. 2 is a schematic flow chart of a method for preparing website data in response to a webpage request according to the present application, and the method includes the following steps:

Step 201. Receive a first data search request from a user terminal (e.g., a PC or a smartphone), where the first data search request includes N elements selected from N datasets, and N is a natural number no less than 2.

A user enters a search webpage, selects one element in each dataset (e.g., a drop-down menu), and clicks a "search" button to send a data search request including one or more user-selected elements or elements to a search server.

Here, it is assumed that there are N datasets: the first dataset has X1 elements, the second dataset has X2 elements, . . . , the (N−1)th dataset has X(n−1) elements, and the Nth dataset has Xn elements.

Step 202. Divide the N datasets into (N−1) portions and the Nth portion, and combine the elements in the (N−1) portions to obtain combined elements M.

When the elements of the (N−1) portions are being combined, the first dataset and the second dataset may be first combined into a new sub-combination, and the sub-combination includes X1*X2 elements; the new sub-combination is then combined with the third dataset, that is, X1*X2*X3 elements are included; in this manner, the first dataset to the (N−1)th dataset are combined into a big dataset M, which includes X1*X2*X3* . . . *X(n−1) elements; in the end, only two datasets are left: this big dataset M and the Nth dataset.

Step 203. Retrieve an element of the Nth portion from the data search request, where the element is represented by Xn1, and an element of other (N−1) portions is represented by Xm1, combine Xm1 and all elements in the Nth dataset to obtain combined elements A, and combine Xn1 and all elements in M to obtain combined elements B.

Step 204. Acquire application data corresponding to the combined elements A and application data corresponding to the combined elements B from an application database, put the application data in a cache, where same data is not repeatedly stored, and send application data corresponding to Xn1 and Xm1 to the user terminal.

Note that, in some embodiments, the application data associated with the combination of the first element and the second element is retrieved from the application database in response to the first webpage request. In other words, the application data associated with the combination of the first element and the second element was not in the cache before receiving the first data search request. In some other embodiments, the application data associated with the combination of the first element and the second element is retrieved from the application database in response to another webpage request that does not include one of the first element and the second element before the first webpage request. In other words, the application data associated with the combination of the first element and the second element was already pulled out of the application database and stored in the cache in response to another previous request that includes one of the first and second elements, Xn1 and Xm1.

The search server may further generally clean data stored in the cache, which specifically includes: after the data is put in the cache in this step, further starting a timer for application data associated with each combination of elements, and deleting the application data associated with a combination of elements from the cache when the corresponding timer indicates that the application data has not been used for responding to a webpage request for at least a predefined amount of time.

In some embodiments, the timer is reset for the application data associated with a combination of elements whenever the application data is used for responding to a webpage request. By doing so, the application data associated with more frequently used combination of elements can stay longer in the cache than the application data associated with less frequently used combination of elements. Accordingly, the computer server can respond to a client device's webpage request more promptly.

Subsequently, a subsequent data search request may be further received from the user terminal, and is referred to as a second data search request, the processing solution of which includes:

receiving the second data search request including the N elements, retrieving an element of the Nth portion from the second data search request, where the element is represented by Xn2, and the element of other (N−1) portions is represented by Xm2; and retrieving application data corresponding to Xn2 and Xm2 from the cache, and send the application data to the user terminal.

Note that the application data corresponding to Xn2 and Xm2 is guaranteed to be found in the cache assuming that either Xm2 is the same as Xm1 or Xn2 is the same as Xn1. If Xm2 is different from Xm1 and Xn2 is different from Xn1, the computer server may or may not be able to retrieve the application data corresponding to Xn2 and Xm2 from the cache. When this event occurs, the computer server may have to retrieve the application data corresponding to Xn2 and Xm2 from the application database by submitting a query including Xn2 and Xm2 in the query.

In some embodiments, the second data search request includes the first element present in the first data search request and a third element. Although different from the second element in the first data search request, the third element also belongs to the second dataset as the second element does. In response to the second data search request, the computer server queries the cache for application data associated with a combination of the first element and the third element, generates a second response using the application data associated with the combination of the first element and the third element and stored in the cache and returns the second response to the client device.

In addition to returning the second response to the client device, the computer server may generate a third set of combinations between the third element and respective elements of the first dataset. For each of the third set of combinations of elements, the computer server queries the cache for the corresponding application data. If not found in the cache, the computer server retrieves the application data associated with each of the third set of combinations of elements from the application database and stores the retrieved application data in the cache.

Generally speaking, data that meets the subsequent demand of the user is stored in the cache, and according to an input element of the dataset, the data can be directly retrieved from the cache and sent to the user terminal; subsequently, it is further determined whether a change occurs to an element of the first dataset to the (N−1)th dataset or a change occurs to an element of the Nth dataset:

if a change occurs to an element of the first dataset to the (N−1)th dataset, combining Xm2 and all elements in the Nth dataset to obtain combined elements C, acquiring application data corresponding to the combined elements C from the application database, and putting the application data in the cache, where application data that already exists in the cache is not repeatedly stored; and if a change occurs to an Nth dataset, combining Xn2 and all elements in M to obtain combined elements D, acquiring application data corresponding to the combined elements D from the application database, and putting the application data in the cache, where application data that already exists in the cache is not repeatedly stored.

For a few cases, if the application data corresponding to Xn2 and Xm2 is not stored in the cache, and a change occurs to both an element of the first dataset to the (N−1)th dataset and an element of the Nth dataset, the process returns to execute Step 202.

As noted above in Manner 1, a usage rate of the cache is not high, whereas in Manner 2, a usage rate of the cache is high, but a usage rate of data is low and a resource waste is big. In the present application, after a first data search request is received, a part of application data is put in a cache, and the part of application data is data that is mot possibly to be viewed by a user subsequently. In this case, a compromise is made between Solution 1 and Solution 2, which increases a usage rate of the cache while saving a resource, so as to further meet a demand.

The solution of the present application is described below by also using the instance of two datasets (e.g., two drop-down menus shown in FIG. 1). In the instance, the datasets include a region (Northern China, Eastern China, Southern China) and a year (2011, 2012, 2013), where each dataset has three options.

1. Receive a first-time search request:

Here, elements included in the first-time search request sent to a search server are Northern China and 2013. Also, a default request when an initial page is opened may also be used as the first data search request.

Figure 3:
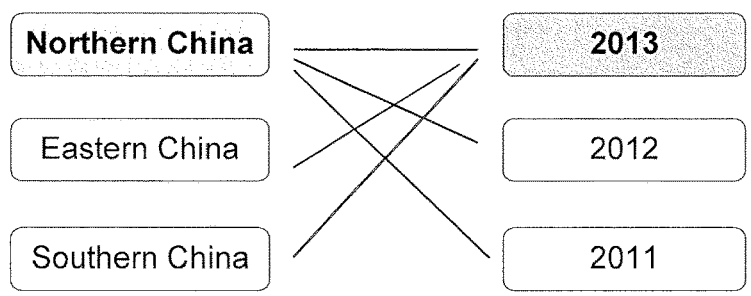
FIG. 3 shows Instance 1 of combining elements of datasets for preparing website data in response to a webpage request according to the present application.

The search server generates: combined elements A: Northern China 2013, Northern China 2012, and Northern China 2011; and combined elements B: Northern China 2013, Eastern China 2013, Southern China 2013. The search server acquires application data corresponding to all combined elements in A from an application database, and puts the application data in a cache; acquires application data corresponding to all combined elements in B, where data corresponding to Northern China 2013 is only stored once; and sends application data corresponding to Northern China 2013 to a user terminal for display. In this case, application data associated with five combinations, that is, Northern China 2013, Northern China 2012, Northern China 2011, Eastern China 2013, and Southern China 2013 is stored in the cache. The application data of the five combinations happens to only include all possibilities of changes that the user is to make to drop-down menus next time. That is, after the user has viewed the data of Northern China 2013, regardless of switching the region or the year, the data of a second-time request is included in the 4 combinations (Northern China 2012, Northern China 2011, Eastern China 2013, and Southern China 2013). In this case, if the user changes an option in the drop-down menus, the cache is definitely to be used and it is the minimum range of data that has been cached. As shown in FIG. 3, gray boxes are currently chosen elements, and straight lines represent elements that are cached currently.

2. Receive a second search request in which only the region is changed:

At the second-time request, it is assumed that the user switches from Northern China to Eastern China, and in this case the chosen values of the drop-down menus are Eastern China+2013. Because application data of Eastern China 2013 exists in the cache, the application data is directly retrieved from the cache and returned to the user. The search server further checks whether application data of Eastern China 2012 and Eastern China 2011 exists in the cache, and if not, retrieve the application data and store the application data in the cache.

This measure has two advantages:

1) When Northern China is switched to Eastern China, data is retrieved from the cache, so that a response speed is high and desirable user experience is ensured.

2) The retrieval of data of Eastern China 2012 and Eastern China 2011 and the storage of the data in the cache do not affect user experience, and instead ensure that data in the cache continues to include all possibilities of changes that the user is to make to the drop-down menus next time (excluding a cache miss or a manual removal, among other factors), so as to prepare for a second switch of the user.

Figure 4:
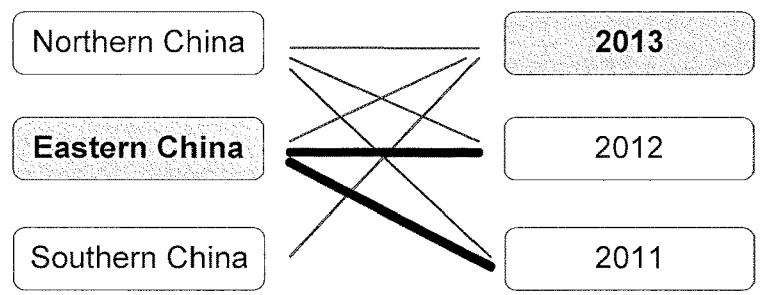
FIG. 4 shows Instance 2 of combining elements of datasets for preparing website data in response to a webpage request according to the present application.

In this case, the chosen values of the drop-down menus are Eastern China+2013, and the data in the cache is 7 combinations in total, that is, Northern China 2013, Northern China 2012, Northern China 2011, Eastern China 2013, Southern China 2013, Eastern China 2012, and Eastern China 2011. As shown in FIG. 4, the gray boxes are currently chosen values, and thin straight lines represent elements cached in the first-time search, and thick straight lines represent elements cached in the current-time search.

If after the user switches the drop-down menus, the data of Eastern China 2013 does not exist in the cache (a miss or a manual deletion or other causes), an application program checks again whether application data corresponding to Eastern China 2012 and Eastern China 2011 exist in the cache, retrieves either or both, that do not exist, of the 2 combinations as well as application data corresponding to Eastern China 2013 from the application database, returns the application data corresponding to Eastern China 2013 to the user terminal, and stores all the retrieved data in the cache.

3. Receive a second search request in which only the year is changed:

Next, at a third-time request, if the user switches the year from 2013 to 2012, in this case, the chosen values of the drop-down menus are Eastern China+2012; because the application data corresponding to the Eastern China 2012 exists in the cache, the application data is directly retrieved from the cache and returned to the user terminal, and the search server then further checks whether application data corresponding to Northern China 2012 and Southern China 2012 exists in the cache and retrieves the application data that does not exist and store the application data in the cache.

The objective of such a measure is the same as the previous step:

1) When 2013 is switched to 2012, the data is retrieved from the cache, so that a response speed is high and desirable user experience is ensured.

2) The retrieval of the data of Northern China 2012 and Southern China 2012 and the storage of the data in the cache do not affect user experience, and instead ensure that data in the cache continues to include all possibilities of changes that the user is to make to the drop-down menus next time (excluding a cache miss or a manual removal, among other factors), so as to prepare for a second switch of the user. In addition, because the data of Northern China 2012 already exists in the cache at the first-time request, only the data of Southern China 2012 is added in the cache at the current time.

In this case, the chosen values of the drop-down menus are Eastern China+2012, and the data in the cache is 8 combinations in total, that is, Northern China 2013, Northern China 2012, Northern China 2011, Eastern China 2013, Southern China 2013, Eastern China 2012, Eastern China 2011, and Southern China 2012.

Figure 5:
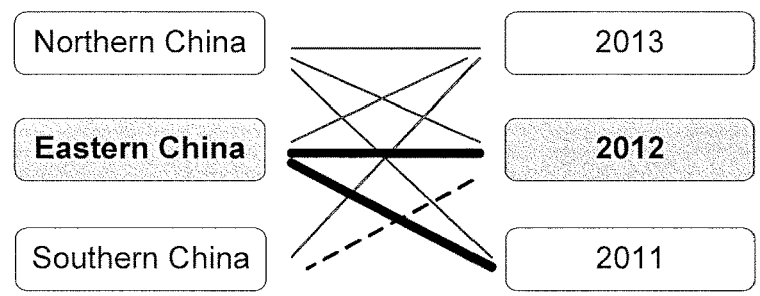
FIG. 5 shows Instance 3 of combining elements of datasets for preparing website data in response to a webpage request according to the present application.

As shown in FIG. 5, the gray boxes are currently chosen values, the thin straight lines represent the elements cached at the first-time request, thick straight lines represent elements cached in the second-time request, and the dotted line represents the element cached in the current-time request.

At the second-time search and the third-times search, the measure is adopted when it is known that the user has switched one drop-down menu. If such a condition is not satisfied or both the drop-down menus are changed, for example: enter an initial page, manually refresh a current page, and directly visit a search page in a manner of inputting a URL+a parameter; the processing is performed in the manner at the first-time search for these cases.

As can be seen from the foregoing instance, the progressive caching solution of the present application is always only one step ahead of the user.

Figure 6:
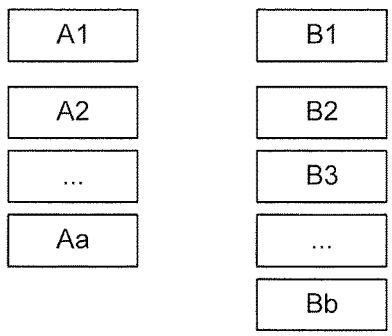
FIG. 6 shows Instance 4 of combining elements of datasets for preparing website data in response to a webpage request according to the present application.

Derivatively, in a case in which there are two drop-down menus: drop-down menus A (including a options A1-Aa) and B (including b options B1-Bb), as shown in FIG. 6, A and B are independent from each other, fixed, and are unlinked.

(1) During a search, A1B1 is chosen. If data of A1B1 exists in a cache, the data is retrieved from the cache, and if the data of A1B1 does not exist in the cache, the data is retrieved from an application database and then returned to a user, and data of (a+b−1−k) combinations ($0<=k<=a+b-1$, (a+b−1) combinations in total, that is, A1B1+A1-B2+ . . . +A1Bb+B1A2+B1A3+ . . . +B1Aa, in which k combinations that exist in the cache are removed, resulting in (a+b−1−k) combinations in total) is retrieved from the application database and stored in the cache. In this case, the data in the cache happens to only include all possibilities of changes that the user is to make to the drop-down menus next time. The cache is cleaned up periodically, and during a search, if corresponding data exists in the cache, the data is directly retrieved from the cache.

(2) If the user switches A from A1 to Ax ($1<x<=a$), in this case, the chosen values of the drop-down menus turn into Ax+B1. If data of AxB1 exists in the cache, the data is retrieved from the cache, and if the data of AxB1 does not exist in the cache, the data is retrieved from the application database and then returned to the user, and data of (b−n) combinations ($0<=n<=b$, b combinations in total, that is, AxB+AxB2+ . . . +AxBb, in which n combinations that exist in the cache are removed, resulting in (b−n) combinations) is retrieved and stored in the cache. In this case, the data in the cache continues to include all possibilities of changes that the user is to make to the drop-down menus next time (an optimal case, excluding a cache miss or a manual removal, among other factors).

(3) If the user switches B from B1 to By ($1<y<=b$), in this case, the chosen values of the drop-down menus turn into Ax+By. If data of AxBy exists in the cache, the data is retrieved from the cache, and if the data of AxBy does not exist in the cache, the data is retrieved from the application database and then returned to the user, and data of (a−m) combinations ($0<=m<=a$, a combinations in total, that is, ByA1+ByA2+ . . . +ByAa, in which m combinations that exist in the cache are removed, resulting in (a−m) combinations) is retrieved and stored in the cache. In this case, the data in the cache continues to include all possibilities of changes that the user is to make to the drop-down menus next time (an optimal case, excluding a cache miss or a manual removal, among other factors).

(4) If the user continues to switch A, repeat the operations in Step 2, and if the user continues to switch B, repeat the operations in Step 3.

(5) For a case it is not clear which drop-down menu is changed or both drop-down menus are changed, for example: enter an initial page, manually refresh a current page, and directly visit a page in a manner of inputting a URL+a parameter; the processing is performed based on step 1 for these cases.

A case in which there are three drop-down menus is further described below. The three drop-down menus are: drop-down menus A (including a options A1-Aa), B (including b options B1-Bb), and C (including c options C1-Cc); A, B, and C are independent from each other, fixed, and unlinked.

Figure 7:
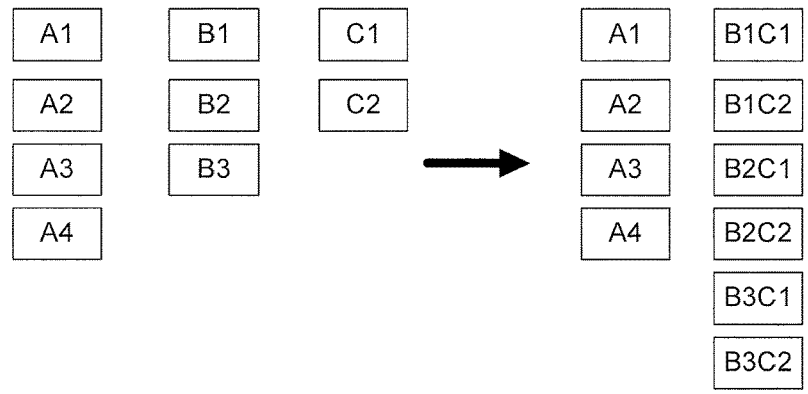
FIG. 7 shows Instance 5 of combining elements of datasets for preparing website data in, response to a webpage request according to the present application.

The core concept of processing three drop-down menus is to combine two into one in algorithm and then the one and the other are processed based on the foregoing method for two drop-down menus, as shown in FIG. 7.

(1) Regard B and C as one option, which is referred to as BC. In this case, BC includes b*c options (B1C1+B1-C2+ . . . +BbCc).

(2) A1B1C1 is chosen by default in an initial page. If data of A1B1C1 exists in a cache, the data is retrieved from the cache, and if the data of A1B1C1 does not exist in the cache, the data is retrieved from a database and then returned to a user, and data of (a+b*c−1−k) combinations are stored in the cache. In this case, the data in the cache happens to only include all possibilities of changes that the user is to make to the drop-down menus next time.

(3) If the user switches A from A1 to Ax ($1<x<=a$), in this case, the chosen values of the drop-down menus turn into Ax+B1+C1. If data of AxB1C1 exists in the cache, the data is retrieved from the cache, and if the data of AxB1C1 does not exist in the cache, the data is retrieved from the database and then returned to the user, and data of (b*c−n) combinations is retrieved and stored in the cache. In this case, the data in the cache continues to include all possibilities of changes that the user is to make to the drop-down menus next time (an optimal case, excluding a cache miss or a manual removal, among other factors).

(4) If the user switches B from B1 to By ($1<y<=b$), in this case, the chosen values of the drop-down menus turn into Ax+By+C1. If data of AxByC1 exists in the cache, the data is retrieved from the cache, and if the data of AxByC1 does not exist in the cache, the data is retrieved from the database and then returned to the user, and data of (a−m) combinations is retrieved and stored in the cache. In this case, the data in the cache continues to include all possibilities of changes that the user is to make to the drop-down menus next time (an optimal case, excluding a cache miss or a manual removal, among other factors).

(5) If the user switches C from C1 to Cz ($1<z<=c$), in this case, the chosen values of the drop-down menus turn into Ax+By+Cz. If data of AxByCz exists in the cache, the data is retrieved from the cache, and if the data of AxByCz does not exist in the cache, the data is retrieved from the database and then returned to the user, and data of (a−m) combinations is retrieved and stored in the cache. In this case, the data in the cache continues to include all possibilities of changes that the user is to make to the drop-down menus next time (an optimal case, excluding a cache miss or a manual removal, among other factors).

Practically, a change to B or C is regarded as a change to BC, and the method is the same.

In addition, which two of three drop-down menus are chosen for combination also affects the amount of data to be cached later. For example, in FIG. 7, A has 4 elements, B has 3 elements, and C has 2 elements, B and C are combined, the number of cached elements in an initial page is at most 9: 4+3*2−1−0=9. If A and B are combined, the number is at most 13: 2+4*3−1−0=13.

Generally, a combination having the largest number of elements is not used, so that the least data is cached in the initial page.

A common data selection manner for current websites is two or three datasets. The present application adopts a designed solution of progressive caching, the core concept of which is always only one step ahead of a user. Data in a cache is added and updated along with interactions of the user, so as to ensure a usage rate of the cache while increasing a usage rate of the data as much as possible, thereby reducing a large resource waste.

The solution of the present application may be adopted for four and more drop-down menus for data search; however, four and more drop-down menus are seldom seen in practical applications, and the method is similar and is no longer elaborated here.

Figure 8:
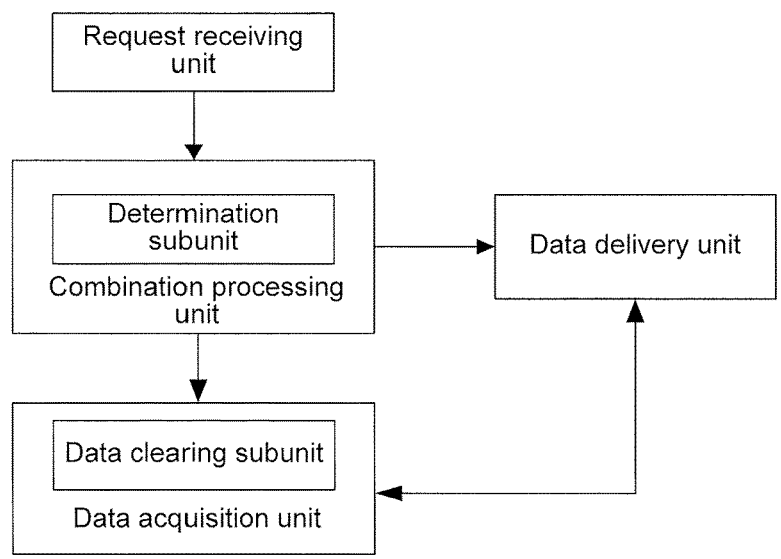
FIG. 8 is a schematic structural diagram of a search computer server for preparing website data in response to a webpage request according to the present application.

Referring to FIG. 8, FIG. 8 is a schematic structural diagram of a search server for preparing website data in response to a webpage request according to the present application. The search server includes a request receiving unit, a combination processing unit, a data acquisition unit, and a data delivery unit.

The request receiving unit receives a first data search request from a user terminal, where the first data search request includes N elements selected from N datasets, and N is a natural number no less than 2, and sends the data search request to the combination processing unit.

The combination processing unit receives the data search request from the request receiving unit, divides the N datasets into (N−1) portions and the Nth portion, and combines the elements in the (N−1) portions to obtain combined elements M; retrieves an element of the Nth portion from the data search request, where the element is represented by Xn1, and an element of other (N−1) portions is represented by Xm1, combines Xm1 and all elements in the Nth dataset to obtain combined elements A, and combines Xn1 and all elements in M to obtain combined elements B; and sends an acquisition request including the combined elements A and B to the data acquisition unit, and sends a delivery request including the Xn1 and Xm1 to the data delivery unit.

The data acquisition unit acquires application data corresponding to the combined elements A and application data corresponding to the combined elements B from an application database, and puts the application data in a cache, where same data is not repeatedly stored.

The data delivery unit retrieves application data corresponding to Xn1 and Xm1 from the cache and sends the application data to the user terminal.

Preferably, the request receiving unit is further used to receive a second data search request including the N elements and send the second data search request to the combination processing unit.

The combination processing unit retrieves an element of the Nth portion from the second data search request, where the element is represented by Xn2, and the element of other (N−1) portions is represented by Xm2, and sends a delivery request including Xn2 and Xm2 to the data delivery unit.

The data delivery unit is further used to retrieve application data corresponding to Xn2 and Xm2 from the cache and send the application data to the user terminal.

Preferably, the combination processing unit includes a determination subunit, which determines, after sending the application data corresponding to Xn2 and Xm2 to the user terminal, whether a change occurs to an element of the first dataset to the (N−1)th dataset or a change occurs to an element of the Nth dataset: if a change occurs to an element of the first dataset to the (N−1)th dataset, combines Xm2 and all elements in the Nth dataset to obtain combined elements C, sends an acquisition request including the combined elements C to the data acquisition unit, and sends a delivery request including Xn1 and Xm1 to the data acquisition unit; and if a change occurs to an Nth dataset, combines Xn2 and all elements in M to obtain combined elements D, sends an acquisition request including the combined elements D to the data acquisition unit, and sends a delivery request including Xn2 and Xm2 to the data acquisition unit.

The data acquisition unit receives the acquisition request including the combined elements C, acquires application data corresponding to the combined elements C from the application database, and puts the application data in the cache, where application data that already exists in the cache is not repeatedly stored; and further receives the acquisition request including the combined elements D, acquires application data corresponding to the combined elements D from the application database, and puts the application data in the cache, where application data that already exists in the cache is not repeatedly stored.

Preferably, the determination subunit, when determining that the application data corresponding to Xn2 and Xm2 is not stored in the cache, and a change occurs to both an element of the first dataset to the (N−1)th dataset and an element of the Nth dataset, returns to execute the dividing N datasets into (N−1) portions and the Nth portion.

Preferably, the data acquisition unit further includes a data clearing subunit, which starts a timer after the application data is put in the cache, and when a set time of the timer is reached, deletes the application data stored in the cache.

Figure 9:
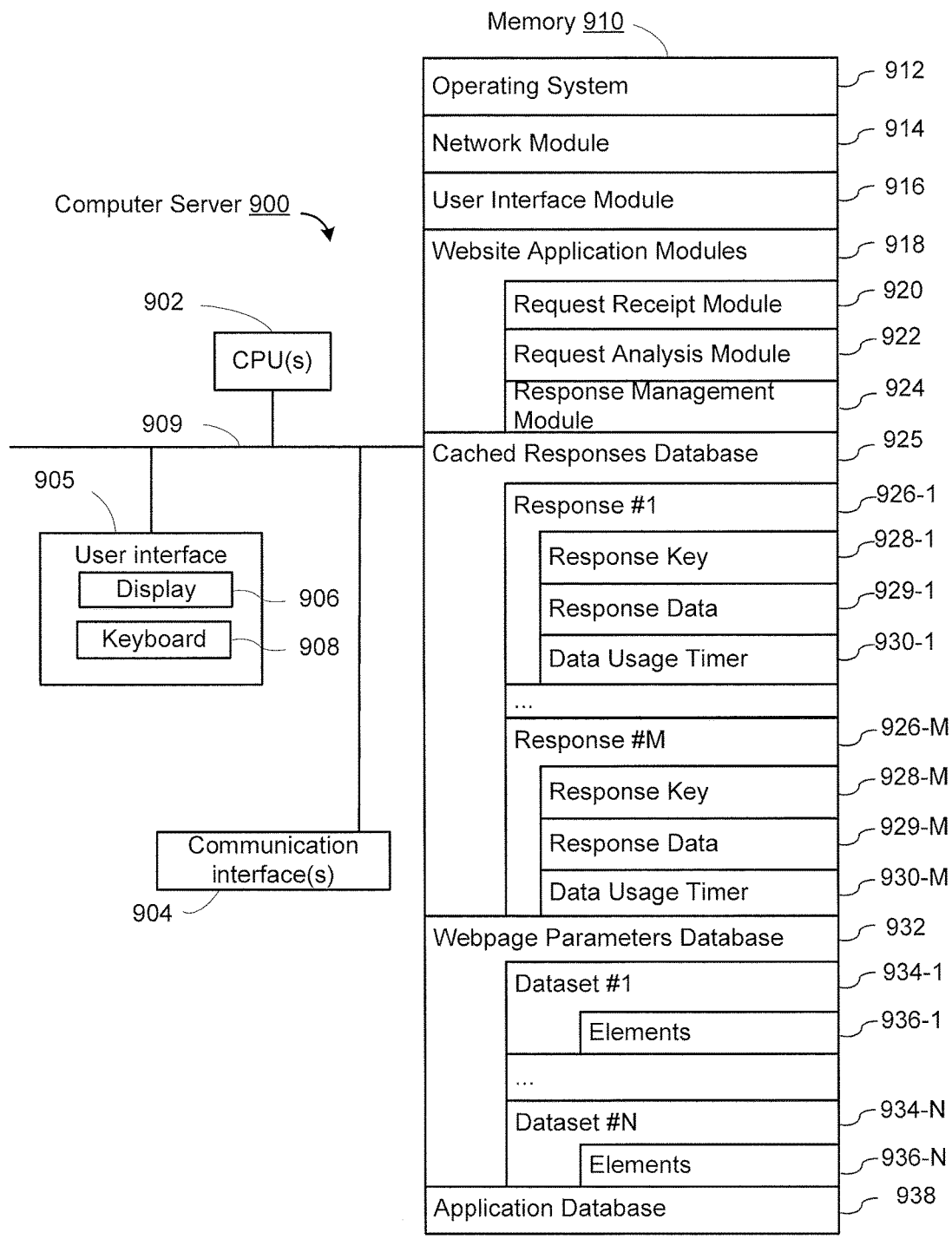
FIG. 9 is a schematic structural diagram of components of a computer server according to the present application.

FIG. 9 is a schematic structural diagram of components of a computer server according to the present application. The exemplary computer server 900 typically includes one or more processing units (CPU's) 902, one or more network or communications interfaces 904, memory 910, and one or more communication buses 909 for interconnecting these components and with other computer systems (e.g., a PC or a smartphone). The communication buses 909 may include circuitry (sometimes called a chipset) that interconnects and controls communications between system components. The computer server 900 may optionally include a user interface 905, for instance, a display 906, and a keyboard 908. Memory 910 may include high speed random access memory and may also include non-transitory computer readable medium, such as one or more magnetic disk storage devices. Memory 910 may include mass storage that is remotely located from the CPU's 902. In some implementations, memory 910 stores the following programs, modules and data structures, or a subset or superset thereof:

- an operating system 912 that includes procedures for handling various basic system services and for performing hardware dependent tasks;
- a network module 914 that is used for connecting the computer server 900 to the client terminals and other computer systems via one or more communication networks (wired or wireless), such as the Internet, other wide area networks, local area networks, metropolitan area networks, and so on;
- a user interface module 916 configured to receive user inputs through the user interface 905;
- a number of website application modules 918 including the following:
  - a request receipt module 920 as described above for receiving a first webpage request initiated by a client device, the webpage request including a first element and a second element, the first element belonging to a first dataset and the second element belonging to a second dataset;
  - a request analysis module 922 as described above for analyzing the webpage request (e.g., identifying elements in the webpage request and their associated datasets); and
  - a response management module 924 as described above for generating a first set of combinations between the first element and respective elements of the second dataset and a second set of combinations between the second element and respective elements of the first dataset, respectively; querying a cache for application data associated with each of the first and second sets of combinations of elements; retrieving, from an application database, application data associated with each of the first and second sets of combinations of elements that returns a cache miss by the querying and storing the retrieved application data in the cache; generating a first response using application data associated with a combination of the first element and the second element and stored in the cache; and returning the first response to the client device.

a cached response database 925 as described above for storing the application data associated with a combination of elements from different datasets, each cached response (926-1, . . . 926-M) further including a response key (928-1, . . . 928-M) that corresponds to the combination of elements from different datasets, response data (929-1, . . . 929-M), and a data usage timer (930-1, . . . 930-M);

a webpage parameters database 932 as described above for storing elements of the different datasets managed by the computer server, each dataset (934-1, . . . , 934-N) further including a plurality of elements (936-1, . . . , 936-N) as shown in FIG. 1; and an application database 938 as described above for storing application data associated with the elements in the webpage parameters database 932 and returning the application data corresponding to a particular combination of elements from different datasets (e.g., a combination of options from multiple drop-down menus).

While particular embodiments are described above, it will be understood it is not intended to limit the present application to these particular embodiments. On the contrary, the present application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the present application herein is for the purpose of describing particular embodiments only and is not intended to be limiting of the present application. As used in the description of the present application and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the present application to the precise forms disclosed. Many modifications and variations are possible in view of the above teachings. The embodiments were chosen and described in order to best explain the principles of the present application and its practical applications, to thereby enable others skilled in the art to best utilize the present application and various embodiments with various modifications as are suited to the particular use contemplated.

What is claimed is:

1. A computer-implemented method comprising:
  at a computer server having one or more processors and memory storing programs to be executed by the one or more processors:
    receiving a first webpage request initiated by a client device, the webpage request including a first element and a second element, the first element belonging to a first dataset including a first plurality of elements and the second element belonging to a second dataset including a second plurality of elements;
    in response to the first webpage request, generating a first set of combinations including the second plurality of combinations between the first element and each element of the second dataset and a second set of combinations including the first plurality of combinations between the second element and each element of the first dataset, respectively;
    identifying, from the first plurality of combinations and the second plurality of combinations, a duplicate of a combination of the first element and the second element;
    removing the duplicate combination of the first element and the second element from the first set of combinations and the second set of combinations to obtain a reduced, combined set of combinations;
    querying a cache for application data associated with each combination from the combined set to identify a first subset of combinations from the combined set of combinations that have been stored in the cache and a second subset of combinations that are not in the cache and identified as cache miss;
    retrieving, from an application database, application data associated with each combination from the second subset of combinations of the cache miss identified by the querying and storing the retrieved application data in the cache;

generating a first response using application data associated with a respective combination of the first element and the second element and stored in the cache;
returning the first response to the client device;
after returning the first response to the client device:
receiving a second webpage request initiated by the client device, the webpage request including the first element and a third element, the third element belonging to the second dataset;
in response to the second webpage request, querying the cache for application data associated with a respective combination of the first element and the third element; and
generating a second response using the application data associated with the combination of the first element and the third element and stored in the cache; and
returning the second response to the client device.

2. The method of claim 1, further comprising:
after returning the second response to the client device:
generating a third set of combinations including the first plurality of combinations between the third element and each element of the first dataset;
querying the cache for application data associated with each of the third set of combinations to identify a third subset of combinations from the third set that have been stored in the cache and a fourth subset of combinations that are not in the cache and identified as cache miss; and
retrieving, from the application database, application data associated with each combination from the fourth subset of combinations of the cache miss identified by the querying and storing the retrieved application data in the cache.

3. The method of claim 1, further comprising:
setting a respective timer for application data associated with each of the first and second sets of combinations of elements and stored in the cache; and
deleting the application data associated with a combination of elements from the cache when the corresponding timer indicates that the application data has not been used for responding to a webpage request for at least a predefined amount of time.

4. The method of claim 3, further comprising:
resetting a timer for the application data associated with a combination of elements when the application data is used for responding to a webpage request.

5. The method of claim 1, wherein the first element is a menu option of a first menu in the webpage and the second element is a menu option of a second menu in the webpage.

6. The method of claim 1, wherein the application data associated with the combination of the first element and the second element is retrieved from the application database in response to the first webpage request.

7. The method of claim 1, wherein the application data associated with the combination of the first element and the second element is retrieved from the application database in response to another webpage request that does not include one of the first element and the second element before the first webpage request.

8. The method of claim 1, wherein the first element is itself a combination of multiple sub-elements belonging to respective sub-datasets, and the step of generating the second set of combinations between the second element and respective elements of the first dataset further comprises:

generating respective sub-combinations by iteratively combining respective sub-elements of each of the sub-datasets; and
generating the second set of combinations by combining the second element with each of the respective sub-combinations.

9. A computer server, comprising:
one or more processors;
memory including non-transitory computer readable medium; and
one or more programs modules stored in the memory and configured for execution by the one or more processors, the one or more program modules further including instructions for:
receiving a first webpage request initiated by a client device, the webpage request including a first element and a second element, the first element belonging to a first dataset including a first plurality of elements and the second element belonging to a second dataset including a second plurality of elements;
in response to the first webpage request, generating a first set of combinations including the second plurality of combinations between the first element and each element of the second dataset and a second set of combinations including the first plurality of combinations between the second element and each element of the first dataset, respectively;
identifying, from the first plurality of combinations and the second plurality of combinations, a duplicate of a combination of the first element and the second element;
removing the duplicate combination of the first element and the second element from the first set of combinations and the second set of combinations to obtain a reduced, combined set of combinations;
querying a cache for application data associated with each combination from the combined set to identify a first subset of combinations from the combined set of combinations that have been stored in the cache and a second subset of combinations that are not in the cache and identified as cache miss;
retrieving, from an application database, application data associated with each combination from the second subset of combinations of the cache miss identified by the querying and storing the retrieved application data in the cache;
generating a first response using application data associated with a respective combination of the first element and the second element and stored in the cache;
returning the first response to the client device;
after returning the first response to the client device:
receiving a second webpage request initiated by the client device, the webpage request including the first element and a third element, the third element belonging to the second dataset;
in response to the second webpage request, querying the cache for application data associated with a respective combination of the first element and the third element; and
generating a second response using the application data associated with the combination of the first element and the third element and stored in the cache; and
returning the second response to the client device.

10. The computer server of claim 9, wherein the one or more program modules further include instructions for:

setting a respective timer for application data associated with each of the first and second sets of combinations of elements and stored in the cache; and deleting the application data associated with a combination of elements from the cache when the corresponding timer indicates that the application data has not been used for responding to a webpage request for at least a predefined amount of time.

11. The computer server of claim 9, wherein the first element is a menu option of a first menu in the webpage and the second element is a menu option of a second menu in the webpage.

12. The computer server of claim 9, wherein the application data associated with the combination of the first element and the second element is retrieved from the application database in response to the first webpage request.

13. The computer server of claim 9, wherein the application data associated with the combination of the first element and the second element is retrieved from the application database in response to another webpage request that does not include one of the first element and the second element before the first webpage request.

14. A non-transitory computer readable storage medium having stored therein one or more instructions, which, when executed by a computer server, cause the computer server to perform the following instructions:

receiving a first webpage request initiated by a client device, the webpage request including a first element and a second element, the first element belonging to a first dataset including a first plurality of elements and the second element belonging to a second dataset including a second plurality of elements;

in response to the first webpage request, generating a first set of combinations including the second plurality of combinations between the first element and each element of the second dataset and a second set of combinations including the first plurality of combinations between the second element and each element of the first dataset, respectively;

identifying, from the first plurality of combinations and the second plurality of combinations, a duplicate of a combination of the first element and the second element;

removing the duplicate combination of the first element and the second element from the first set of combinations and the second set of combinations to obtain a reduced, combined set of combinations;

querying a cache for application data associated with each combination from the combined set to identify a first subset of combinations from the combined set of combinations that have been stored in the cache and a second subset of combinations that are not in the cache and identified as cache miss;

retrieving, from an application database, application data associated with each combination from the second subset of combinations of the cache miss identified by the querying and storing the retrieved application data in the cache;

generating a first response using application data associated with a respective combination of the first element and the second element and stored in the cache;

returning the first response to the client device;

after returning the first response to the client device:

receiving a second webpage request initiated by the client device, the webpage request including the first element and a third element, the third element belonging to the second dataset:

in response to the second webpage request, querying the cache for application data associated with a respective combination of the first element and the third element; and generating a second response using the application data associated with the combination of the first element and the third element and stored in the cache; and returning the second response to the client device.

15. The non-transitory computer readable storage medium of claim 14, wherein the instructions include instructions for:

setting a respective timer for application data associated with each of the first and second sets of combinations of elements and stored in the cache; and deleting the application data associated with a combination of elements from the cache when the corresponding timer indicates that the application data has not been used for responding to a webpage request for at least a predefined amount of time.

16. The non-transitory computer readable storage medium of claim 14, wherein the first element is a menu option of a first menu in the webpage and the second element is a menu option of a second menu in the webpage.

17. The non-transitory computer readable storage medium of claim 14, wherein the application data associated with the combination of the first element and the second element is retrieved from the application database in response to the first webpage request.

18. The non-transitory computer readable storage medium of claim 14, wherein the application data associated with the combination of the first element and the second element is retrieved from the application database in response to another webpage request that does not include one of the first element and the second element before the first webpage request.

* * * * *